United States Patent
Choi et al.

(10) Patent No.: US 9,906,820 B2
(45) Date of Patent: Feb. 27, 2018

(54) METHOD AND SYSTEM FOR PROVIDING VIDEO CONTENT BASED ON IMAGE

(71) Applicant: Korea Advanced Institute of Science and Technology, Daejeon (KR)

(72) Inventors: JunKyun Choi, Daejeon (KR); Kyu Yeong Jeon, Daejeon (KR); JinHong Yang, Daejeon (KR); YongRok Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/149,729

(22) Filed: May 9, 2016

(65) Prior Publication Data
US 2017/0013292 A1  Jan. 12, 2017

(30) Foreign Application Priority Data

Jul. 6, 2015  (KR) .......... 10-2015-0095963
Aug. 20, 2015 (KR) .......... 10-2015-0117535

(51) Int. Cl.
| | | |
|---|---|---|
| G06F 3/00 | (2006.01) |
| G06F 13/00 | (2006.01) |
| H04N 5/445 | (2011.01) |
| H04N 21/234 | (2011.01) |
| H04N 21/233 | (2011.01) |

(Continued)

(52) U.S. Cl.
CPC ..... *H04N 21/23424* (2013.01); *H04N 21/233* (2013.01); *H04N 21/23418* (2013.01); *H04N 21/234336* (2013.01); *H04N 21/4307* (2013.01); *H04N 21/47217* (2013.01); *H04N 21/4884* (2013.01); *H04N 21/812* (2013.01)

(58) Field of Classification Search
None
See application file for complete search history.

(56) References Cited

U.S. PATENT DOCUMENTS

| 2001/0023436 A1* | 9/2001 | Srinivasan | ........... G11B 27/031 709/219 |
| 2002/0081090 A1* | 6/2002 | Agnihotri | ................ H04N 5/76 386/239 |

(Continued)

FOREIGN PATENT DOCUMENTS

| JP | 2005020351 A * | 1/2005 |
| JP | 2008148121 | 6/2008 |

(Continued)

OTHER PUBLICATIONS

Vijayakumar et al., "A study on video data mining," Inl J Multimedia Info Retr (2012), vol. 1, No. 3, pp. 153-172.

*Primary Examiner* — William J Kim
(74) *Attorney, Agent, or Firm* — Leber IP Law; Dennis R. Haszko

(57) ABSTRACT

Disclosed is a method for providing a content, the method including extracting at least one still image from video included in the content, extracting audio, which corresponds to the still image, and generating a script corresponding to the audio, adding a caption to the still image based on the generated script, and providing the content in response to a request of consumption to the content and providing the caption-added still image for the video that is streaming in real time.

13 Claims, 10 Drawing Sheets

(51) Int. Cl.
  *H04N 21/488*     (2011.01)
  *H04N 21/472*     (2011.01)
  *H04N 21/43*      (2011.01)
  *H04N 21/2343*    (2011.01)
  *H04N 21/81*      (2011.01)

(56) References Cited

U.S. PATENT DOCUMENTS

| | | | | |
|---|---|---|---|---|
| 2002/0083473 | A1* | 6/2002 | Agnihotri | G11B 27/105 |
| | | | | 725/140 |
| 2003/0035063 | A1* | 2/2003 | Orr | H04N 7/0885 |
| | | | | 348/465 |
| 2004/0268400 | A1* | 12/2004 | Barde | H04N 7/17318 |
| | | | | 725/94 |
| 2005/0091682 | A1* | 4/2005 | Czeck | H04N 7/17336 |
| | | | | 725/32 |
| 2006/0059236 | A1* | 3/2006 | Sheppard | H04L 51/04 |
| | | | | 709/206 |
| 2006/0064716 | A1* | 3/2006 | Sull | G06F 17/30793 |
| | | | | 725/37 |
| 2006/0269258 | A1* | 11/2006 | Murakoshi | H04N 7/16 |
| | | | | 386/261 |
| 2008/0043996 | A1* | 2/2008 | Dolph | H04N 5/60 |
| | | | | 379/388.07 |
| 2008/0266319 | A1* | 10/2008 | Momosaki | G09G 5/393 |
| | | | | 345/619 |
| 2008/0295040 | A1* | 11/2008 | Crinon | H04N 7/152 |
| | | | | 715/865 |
| 2009/0009661 | A1* | 1/2009 | Murakami | H04N 7/0885 |
| | | | | 348/468 |
| 2009/0022480 | A1* | 1/2009 | Yabe | H04N 5/76 |
| | | | | 386/234 |
| 2010/0095345 | A1* | 4/2010 | Tran | G11B 27/105 |
| | | | | 725/131 |
| 2013/0170753 | A1* | 7/2013 | Tanaka | G06F 17/30256 |
| | | | | 382/190 |
| 2015/0086180 | A1* | 3/2015 | Pan | H04N 21/47214 |
| | | | | 386/241 |
| 2016/0173812 | A1* | 6/2016 | Suh | H04N 21/4622 |
| | | | | 725/32 |

FOREIGN PATENT DOCUMENTS

| | | |
|---|---|---|
| KR | 2006030179 | 4/2006 |
| KR | 2007028253 | 3/2007 |
| KR | 2007084471 | 8/2007 |

\* cited by examiner

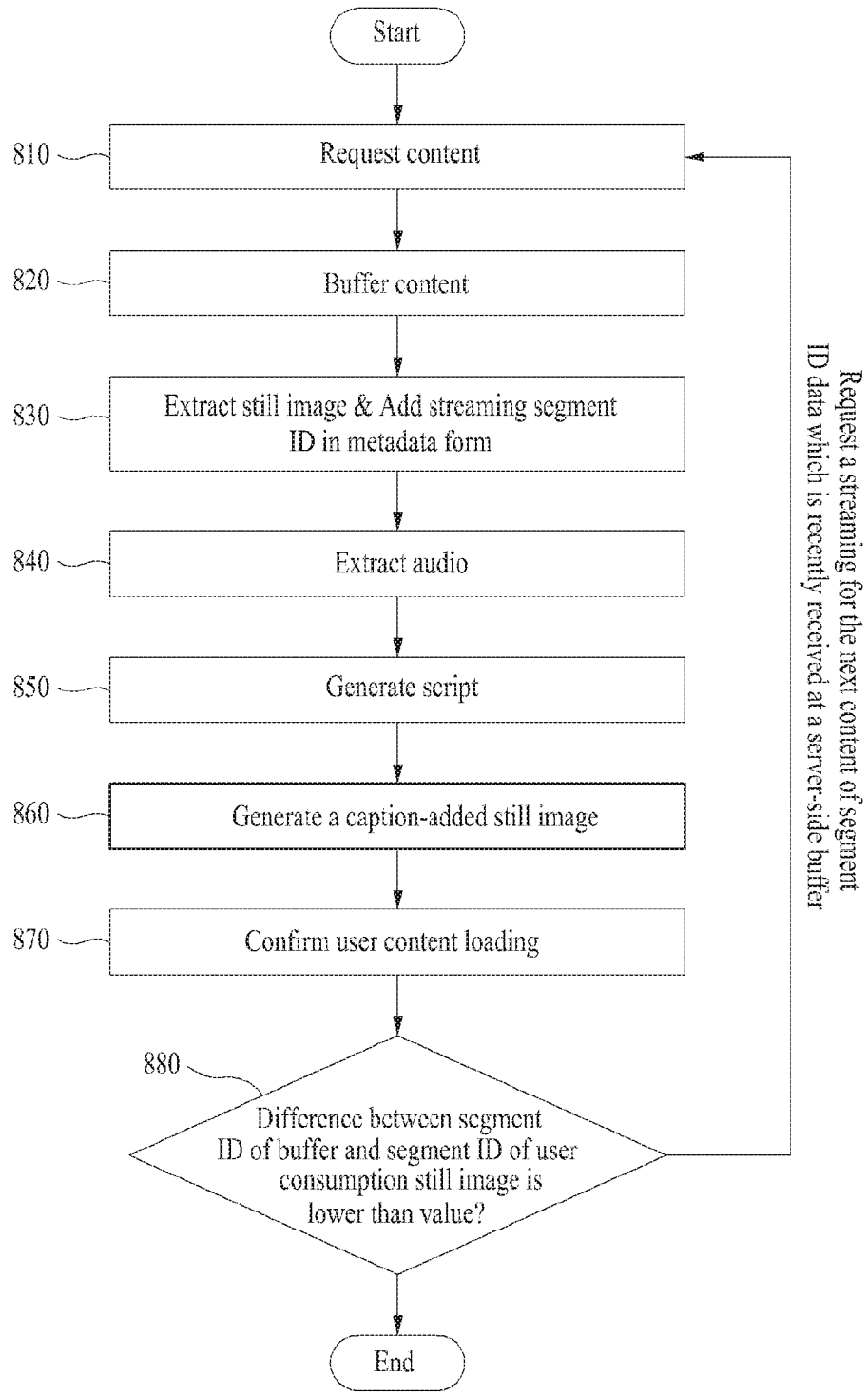

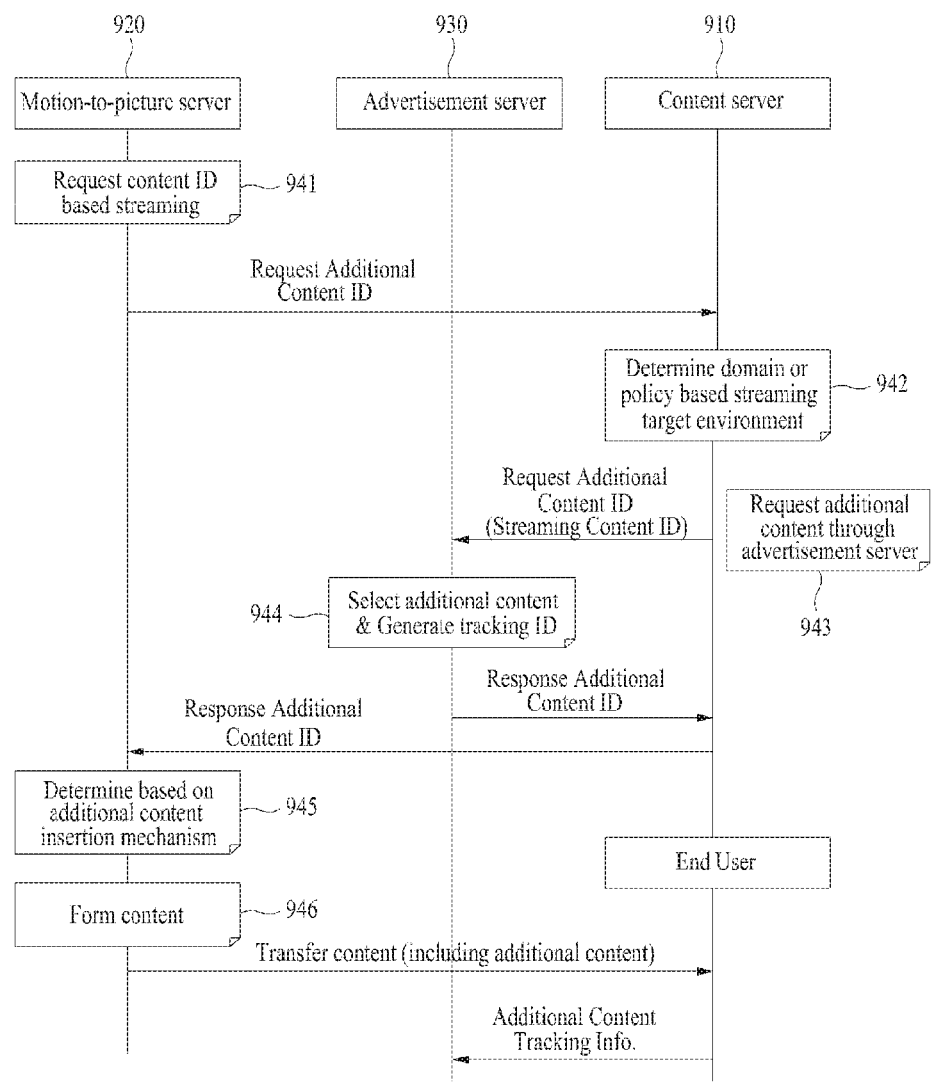

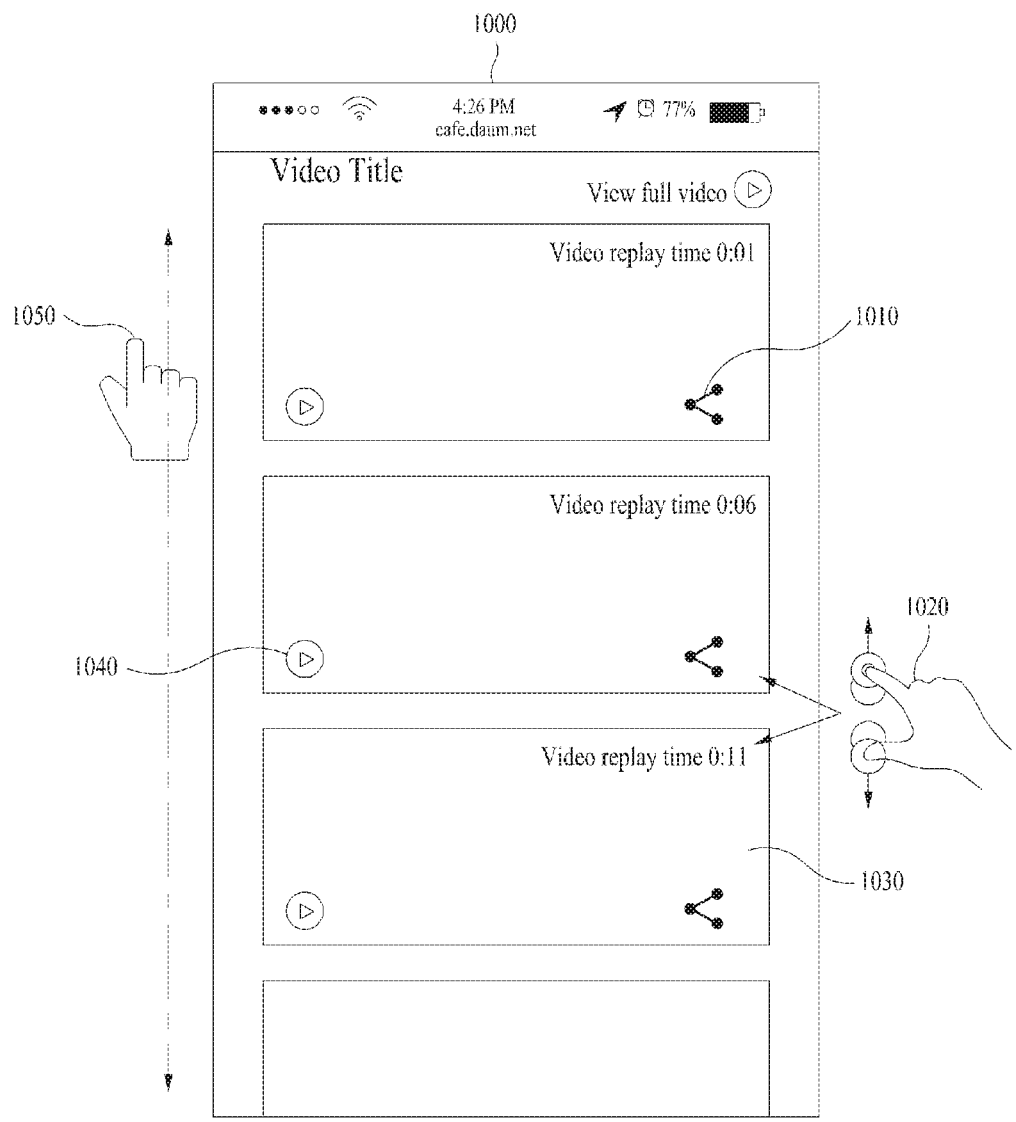

METHOD AND SYSTEM FOR PROVIDING VIDEO CONTENT BASED ON IMAGE

CROSS-REFERENCE TO RELATED APPLICATIONS

A claim for priority under 35 U.S.C. § 119 is made to Korean Patent Application No. 10-2015-0095963 filed Jul. 6, 2015, 10-2015-0117535 filed August 20, in the Korean Intellectual Property Office, the entire contents of which are hereby incorporated by reference.

BACKGROUND

Embodiments of the inventive concept described herein relate to technology of converting video into images, and more particularly, relate to an image-based method and system for providing content.

Nowadays, most online contents (e.g., internet news, web pages, etc.) include video (motion pictures). Users generally dislike replaying video, which includes video, in the following cases. For example, users are reluctant to replay a content, which includes video, in the cases of short data at a user terminal, disliking an initial video loading time, being difficult in using an earphone, being insufficient for replaying video, and disliking uncontrollable situation in the full screen playback.

When users meet such cases, the users terminate to consume contents without replaying video and move to other links. Then, it may decrease video-based advertisement exposure in contents including video, and may increase a cost for user reaction when forming contents including video.

Korean Patent Publication No. 10-2013-0049673 discloses a method and system for providing object information based on spot image of video.

SUMMARY

Embodiments of the inventive concept provide a system for providing content. The system performs a method for providing content by extracting a still image for a principal scene from video and by forming content in a form of image into which a caption or voice information is inserted.

One aspect of embodiments of the inventive concept is directed to a method for providing a content, the method including: extracting at least one still image from video included in the content; extracting audio, which corresponds to the still image, and generating a script corresponding to the audio; adding a caption to the still image based on the generated script; and providing the content in response to a request of consumption to the content and providing the caption-added still image for the video that is streaming in real time.

In an embodiment, the extracting of at least one still image from video included in the content may include: extracting a still image based on identification data of the content by determining inclusion of video that is included in the content or by recognizing state information of a user In an embodiment, the extracting of at least one still image from video included in the content may include: extracting a still image, which is relevant to a section where an effect is inserted, based on audio mining from the video or extracting a still image using metadata information of the video.

In an embodiment, the extracting of at least one still image from video included in the content may include: adding segment identification data by extracting the still image.

In an embodiment, the providing of the content in response to a request of consumption to the content and the providing of the caption-added still image for the video that is streaming in real time may include: loading the content if a difference between segment identification data of a buffer and segment identification data of a still image for a content requested for consumption is lower than a value.

In an embodiment, the providing of the content in response to a request of consumption to the content and the providing of the caption-added still image for the video that is streaming in real time may include: updating the content to the caption-added still image in an asynchronous form at a user terminal and providing an interface for interlocking the content based on an advertisement policy.

In an embodiment, the providing of the content in response to a request of consumption to the content and the providing of the caption-added still image for the video that is streaming in real time may include: providing at least one of functions of adding metadata to the still image, sharing the still image with an external service, replaying video that is included in the content, and adding the still image.

Another aspect of embodiments of the inventive concept is directed to a computer-readable medium with an instruction controlling a computer system to provide a content, wherein the instruction may control the computer system by a method including: extracting at least one still image from video included in the content; extracting audio, which corresponds to the still image, and generating a script corresponding to the audio; adding a caption to the still image based on the generated script; and providing the content in response to a request of consumption to the content and providing the caption-added still image for the video that is streaming in real time.

Still another aspect of embodiments of the inventive concept is directed to provide a system for providing content. The system may include: an extraction part configured to extract at least one still image from video included in the content; a generation part configured to extract audio, which corresponds to the still image, and generating a script corresponding to the audio; an addition part configured to add a caption to the still image based on the generated script; and a provision part configured to provide the content in response to a request of consumption to the content and providing the caption-added still image for the video that is streaming in real time.

In an embodiment, the extraction part may extract a still image based on identification data of the content by determining inclusion of video that is included in the content or by recognizing state information of a user.

In an embodiment, the extraction part may extract a still image, which is relevant to a section where an effect is inserted, based on audio mining from the video or may extract a still image using metadata information of the video.

In an embodiment, the extraction part may add segment identification data by extracting the still image.

In an embodiment, the provision part may load the content if a difference between segment identification data of a buffer and segment identification data of a still image for a content requested for consumption is lower than a value.

In an embodiment, the provision part may update the content to the caption-added still image in an asynchronous form at a user terminal and may provide an interface for interlocking the content based on an advertisement policy.

In an embodiment, the provision part may provide at least one of functions of adding metadata to the still image, sharing the still image with an external service, replaying video that is included in the content, and adding the still image.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 8 is a flow chart showing a content providing method of a content providing system according to an embodiment;

FIG. 9 illustrates a flow of inserting an additional content in a content providing system according to an embodiment; and FIG. 10 illustrates an image-based video consumption scheme in a content providing system according to an embodiment.

DETAILED DESCRIPTION

Embodiments of the inventive concept will be hereafter described in conjunction with the accompanied figures.

Figure 1:
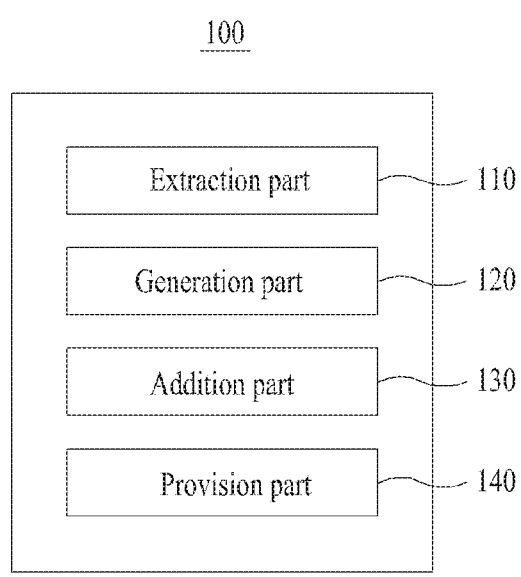
FIG. 1 is a block diagram illustrating a configuration of a content providing system according to an embodiment.

FIG. 1 is a block diagram illustrating a configuration of a system for providing a content (hereafter referred to as 'content providing system') according to an embodiment.

The content providing system 100, for providing a caption-added still image for video included in content, may include an extraction part 110, a generation part 120, an addition part 130, and a provision part 140.

The extract part 110 may extract at least one still image from video which is included in content. The extraction part 110 may extract a still image based on identification data of the content by determining inclusion of video which is included in the content or by recognizing state information of a user.

The extraction part 110 may extract a still image, which is relevant to a section where an effect is inserted, based on audio mining from the video, or may extract a still image using metadata information of the video. During this, the extraction part 110 may add segment identification data by extracting the still image.

The generation part 120 may extract audio corresponding to a still image and then may generate a script corresponding to the script.

The addition part 130 may add a caption to a still image based on a generated script.

The provision part 140 may provide content in response to a request for consumption to the content, for which the content may be provided as a caption-added still image for video which is streaming in real time. The provision part 140 may load content if a difference between segment identification data of a buffer and segment identification data of a still image for a content requested for consumption is lower than a value.

The provision part 140 may update content to a caption-added still image in an asynchronous form at a user terminal, and may provide an interface for interlocking the content based on an advertisement policy. The provision part 140 may provide at least one o functions of adding metadata to a still image, sharing a still image with an external service, replaying video that is included in the content, and adding a still image.

Figure 2:
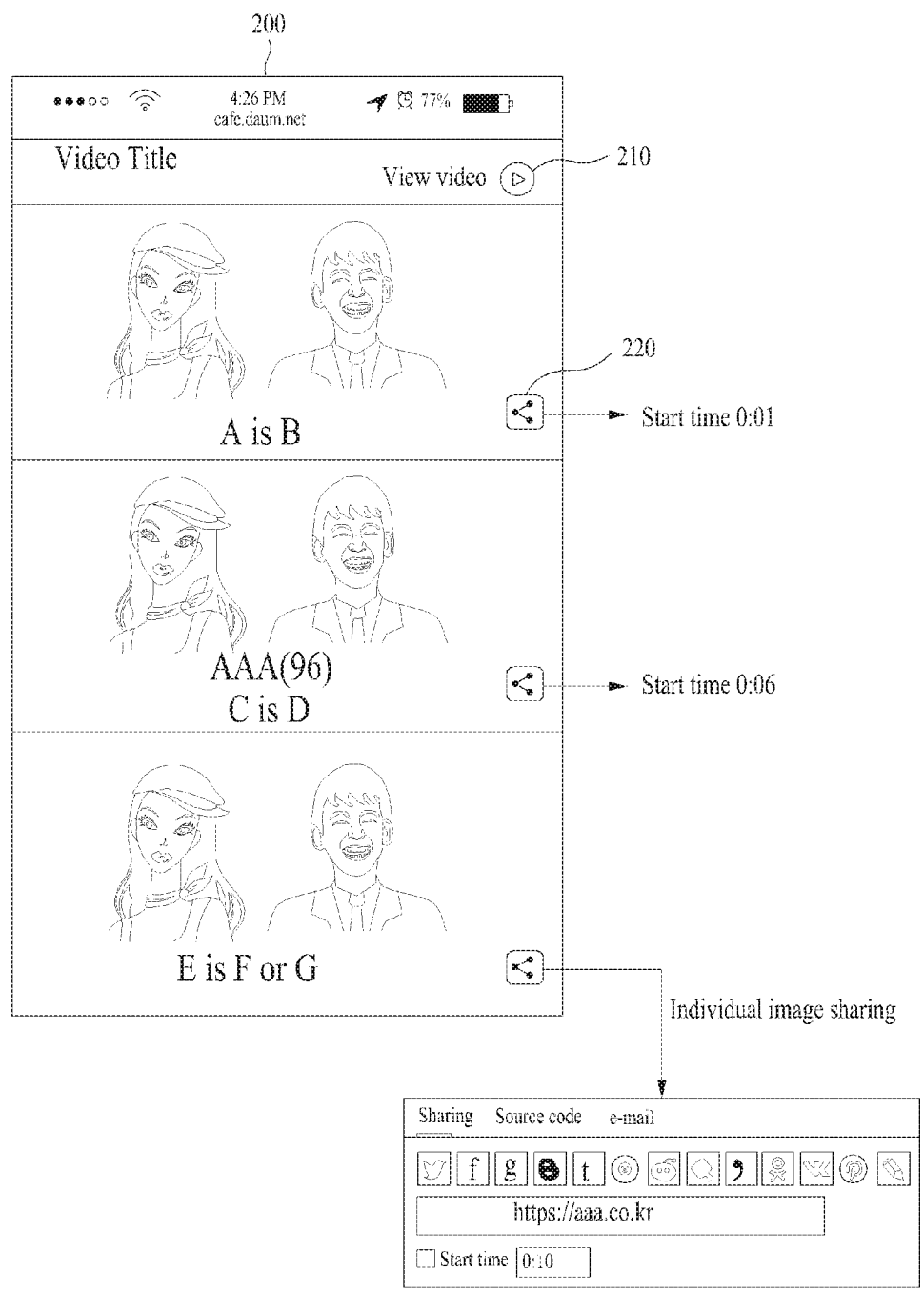
FIG. 2 exemplarily illustrates still images to which captions are added for a content in a content providing system according to an embodiment.

FIG. 2 exemplarily illustrates still images to which captions are added for content in a content providing system according to an embodiment.

The content providing system may extract at least one still image from video which is included in content. The content providing system may extract audio corresponding to a still image and then may generate a script corresponding to the script. The content providing system may add a caption to a still image based on a generated script. The content providing system may provide content in response to a request for consumption to the content, for which the content may be provided as a caption-added still image for video which is streaming in real time.

For example, the content providing system may provide content to s user terminal 200, for which the content may be provided as a caption-added still image for video which is streaming in real time. During this, the content providing system may allow video, which is included in the original content, to be replayed, as well as a still image. The content providing system may provide a video watch interface 210 to allow a user to replay video, which is included in content, through a user terminal. The content providing system may replay video, which is included in content, according as a user selects the video watch interface 210.

The content providing system may output, for example, a still image to which a caption for the start time 0:01 is added, a still image to which a caption for the start time 0:06 is added, and a still image to which a caption for the start time 0:10 is added, to the user terminal 200 from video which is streaming in real time.

The content providing system may provide a common interface 220 which allows a caption-added still image to be shared by an external service such as SNS and e-mail. For example, a user may select the common interface 220 corresponding to one, which is to be shared by an external service, of a plurality of still images output to the user terminal.

As a user selects the common interface 220, the content providing system may display information of a content to permit a caption-added still image to be shared by an external service and may provide an interface to allow the external service to be selected. The content providing system may display an address of content and a start time of a selected still image. For example, a user may select one, which corresponds to a first external service, from interfaces corresponding to a plurality of external service displayed for sharing with the first external service. As a user selects an interface corresponding to the first external service, the content providing system may share a caption-added still image by a first external service.

FIGS. 3 to 6 illustrate operations of a content providing system according to an embodiment.

Figure 3:
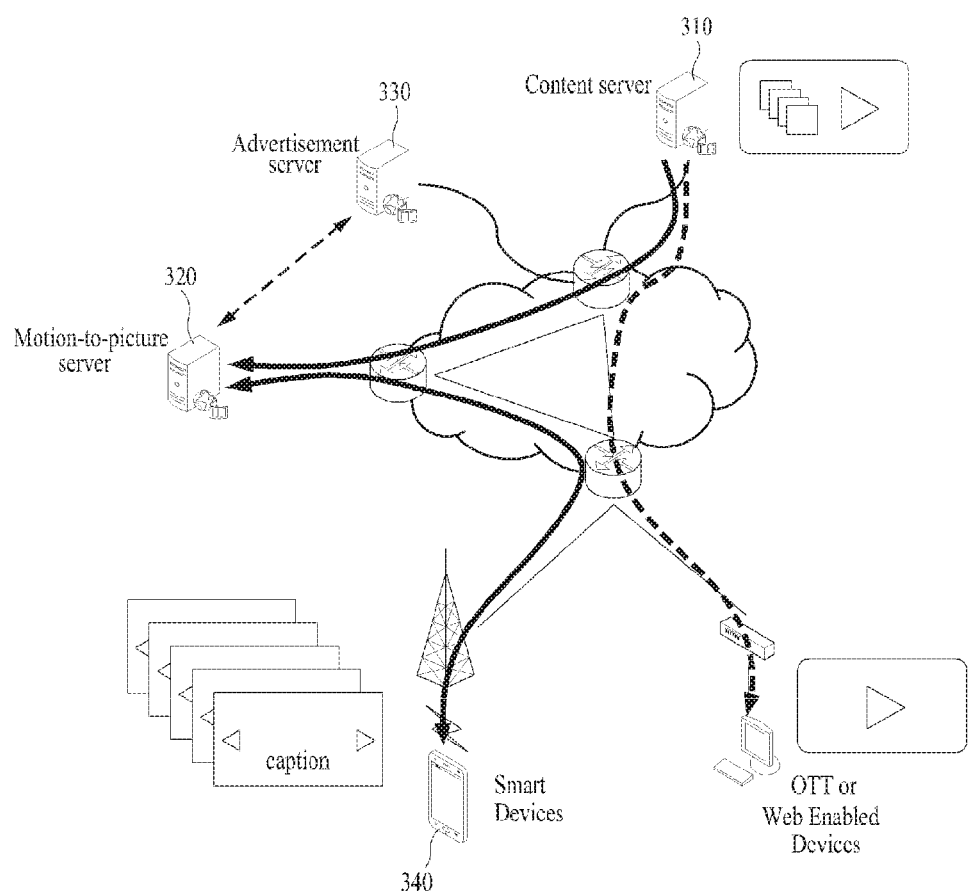
FIGS. 3 to 6 illustrate operations of a content providing system according to an embodiment.

FIG. 3 illustrates a general operation of the content providing system according to an embodiment. The content providing system may operate in a service environment providing content with video. The content providing system may provide video in a form of image based on intention or state information of a user.

A user terminal 340 may mean all kinds of terminals, e.g., PC, laptop computer, smart phone, tablet, and wearable computer, capable of accessing web/mobile sites, or installing and executing service-exclusive applications. The user terminal 340 may perform a general service operation such as service screen formation, data input, data transmission/reception, and storage under control of a web/mobile site or exclusive application.

In the case that there is an additional advertisement server 330, the content providing system may provide the same advertisement even when providing an image-based content based on identification data of content corresponding thereto.

The content providing system may provide a caption-added still image on a browser or application even without an additional server for a motion-to-picture function. The motion-to-picture function may include an operation of providing a content, which includes video, as a caption-added still image by extracting at least one still image from the video included in the content, by extracting audio, which corresponds to the extracted still image, to generate a script, and thereafter by adding a caption to the still image based on the generated script.

In the case that a Content Delivery Network (CDN) is present on a network, the content providing system may dispose a motion-to-picture function on the CDN and then may lessen traffic through a content cashing based thereon.

Figure 4:
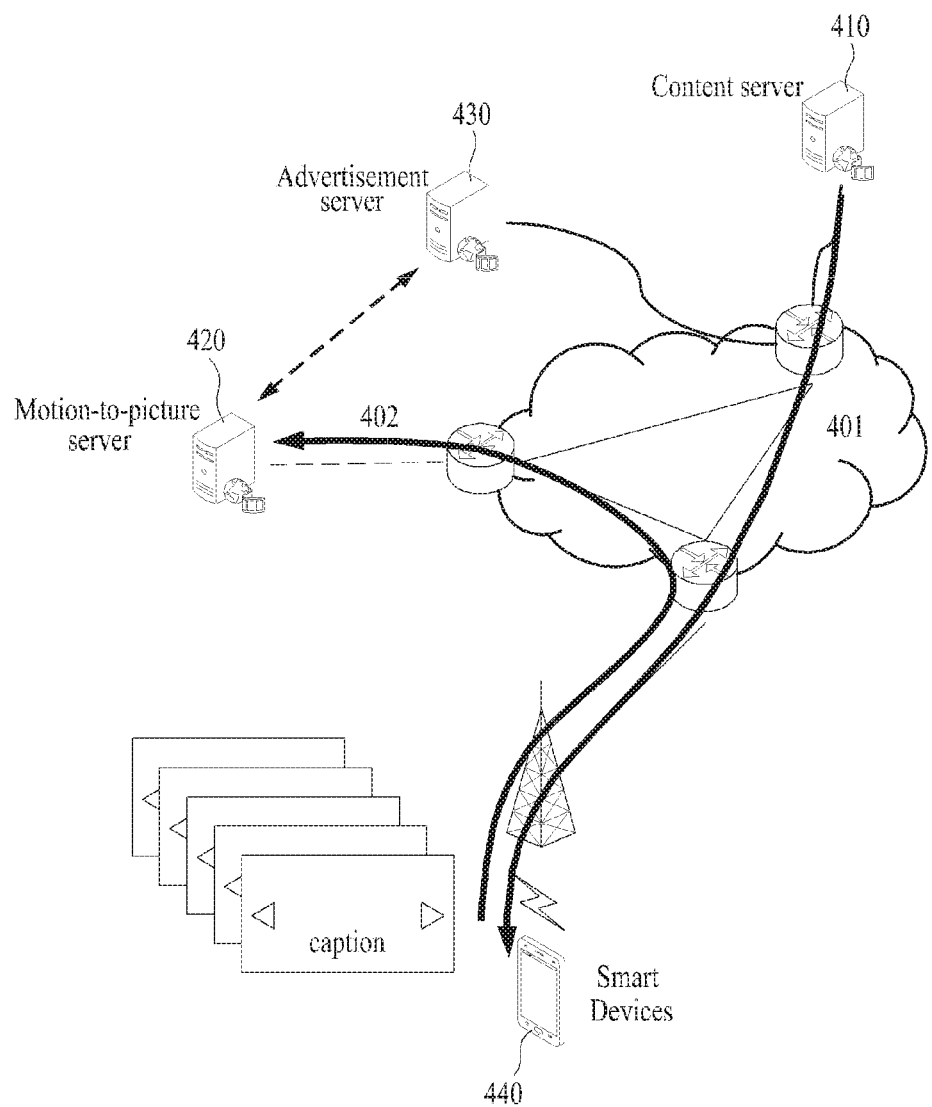
Figure 5:
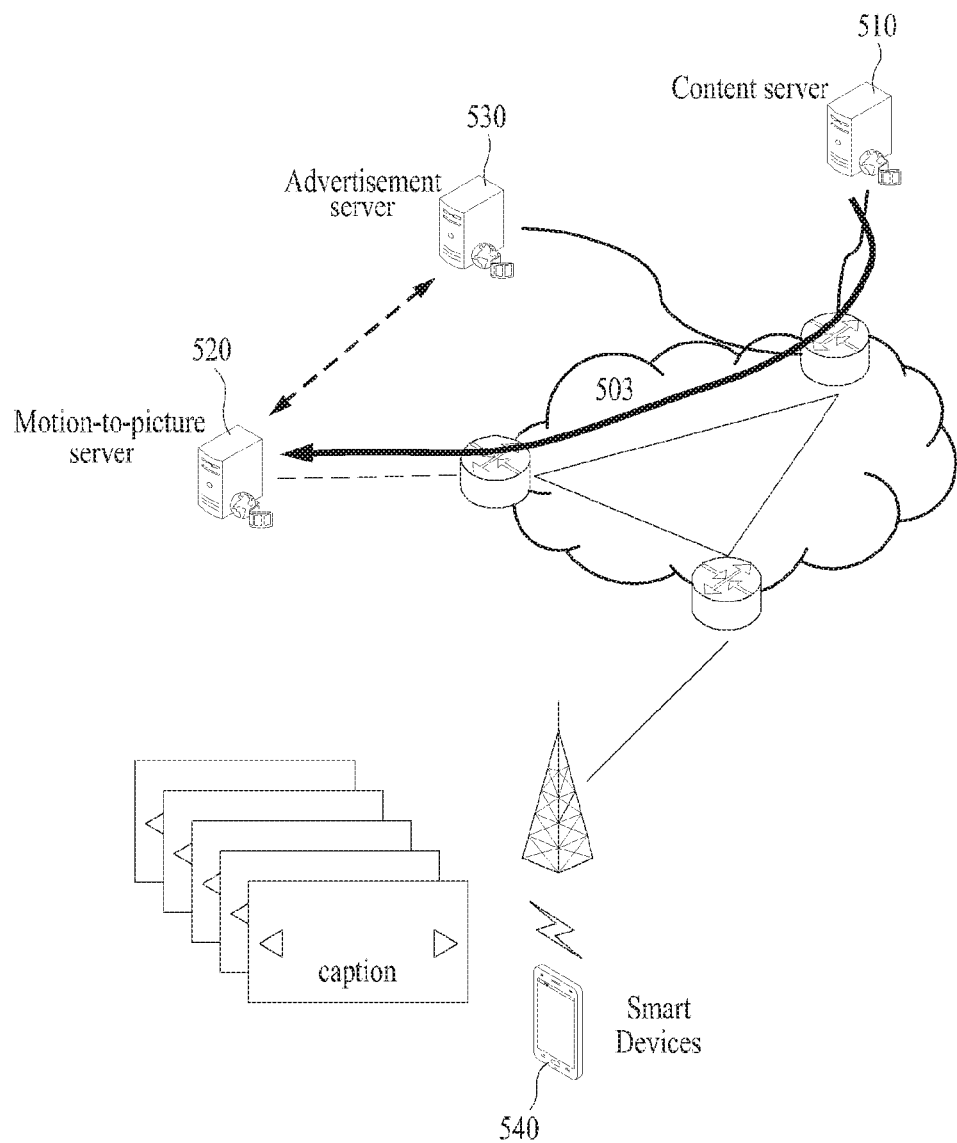
Figure 6:
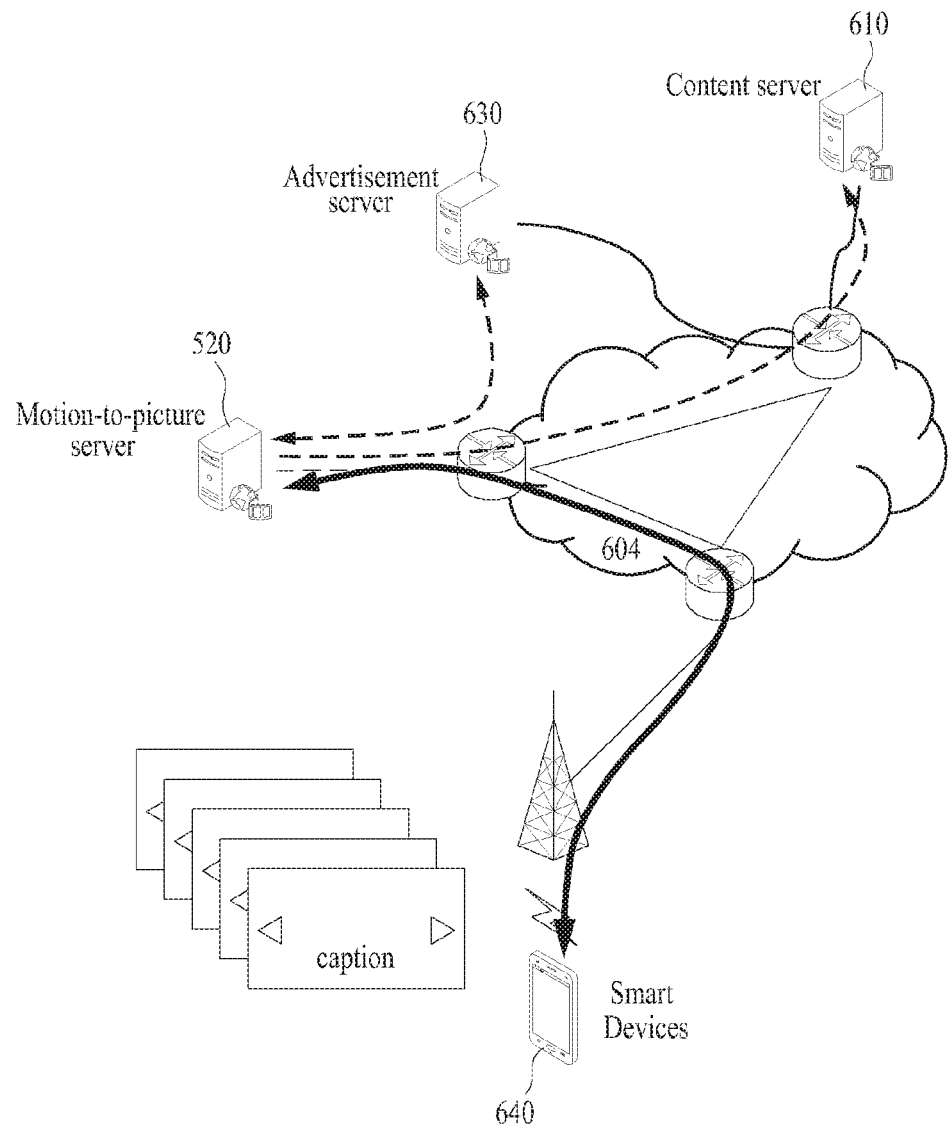

Now FIGS. 4 to 6 will be referred to describe the content providing system to provide a still image where a caption is inserted into a user terminal 440, 540, or 640 through an operation of an original content server 410, 510, or 610, a motion-to-picture server 420, 520, or 620, or an advertisement server 430, 530, or 630. Data may be transmitted or received among the original content server 410, 510, or 610, the motion-to-picture server 420, 520, or 620, and the advertisement server 430, 530, or 630.

Referring to FIG. 4, the original content server 410 may load content to a user terminal 440 (401). A user may confirm whether video is included in content and may request a motion-to-picture function from a service where the content is replayed. Otherwise, the original content server 410 may determine whether video is included in a content of the user terminal 440, or may request a motion-to-picture function from the motion-to-picture server 420 in accordance with recognition of user state (402). During this, the original content server 410 may use differentiation of domains of video ID (IRI) in an embedded tag or an HTML5-based video tag in a content to determine whether video is present in the content.

The original content server 410 may transmit identification data of video to the motion-to-picture server 420. For a service with agreement, a function for interlocking additional advertisement content may be provided based on the identification data of video. For example, the original content server 410 may provide an interface for interlocking an advertisement content, and identification data information for tracking advertisement. During this, an interface based on an advertisement policy may be provided to interlock content between the motion-to-picture server 420 and the advertisement server 530.

Referring to FIG. 5, the original content server 510 may stream video, which is included in content, in the user terminal 540. The motion-to-picture server 520 mat generate a still image in real time for video which is streaming (503). During this, an application of the user terminal 540 may be updated with a content which asynchronously includes a still image.

In the case that video included in content is involved in a streaming service which accords to an adaptive streaming or MPEG DASG standard, a request for an additional content streaming may be performed based on content loading information of a user. Through this operation, it may be allowable for a video service provider and the content providing system to reduce a cost for traffic and process.

Additionally, for a content requested by a user, it may be permissible to provide a negotiation course to a commercial issue such as advertisement, issue, DRM, or license with the original content server 510.

Referring to FIG. 6, the content server 610 may load an additional content in response to a request for content by a user and may insert the additional content thereinto. The motion-to-picture server 620 may provide a content, which is converted in real time, through an application or browser of a user. During this, in the case of receiving a request for an additional content through an advertisement server, the content corresponding thereto may be even provided thereto additionally.

As a user requests for content consumption, information about the content consumption may be provided to the original content server 610 and the advertisement server 630 through the motion-to-picture server 620.

In the case that a user wants to consume content, the user terminal 640 may be directly connected with the content server 610 and the motion-to-picture server 620 may notify the advertisement server 630 of information according to a change of consumption environment of the user.

Figure 7:
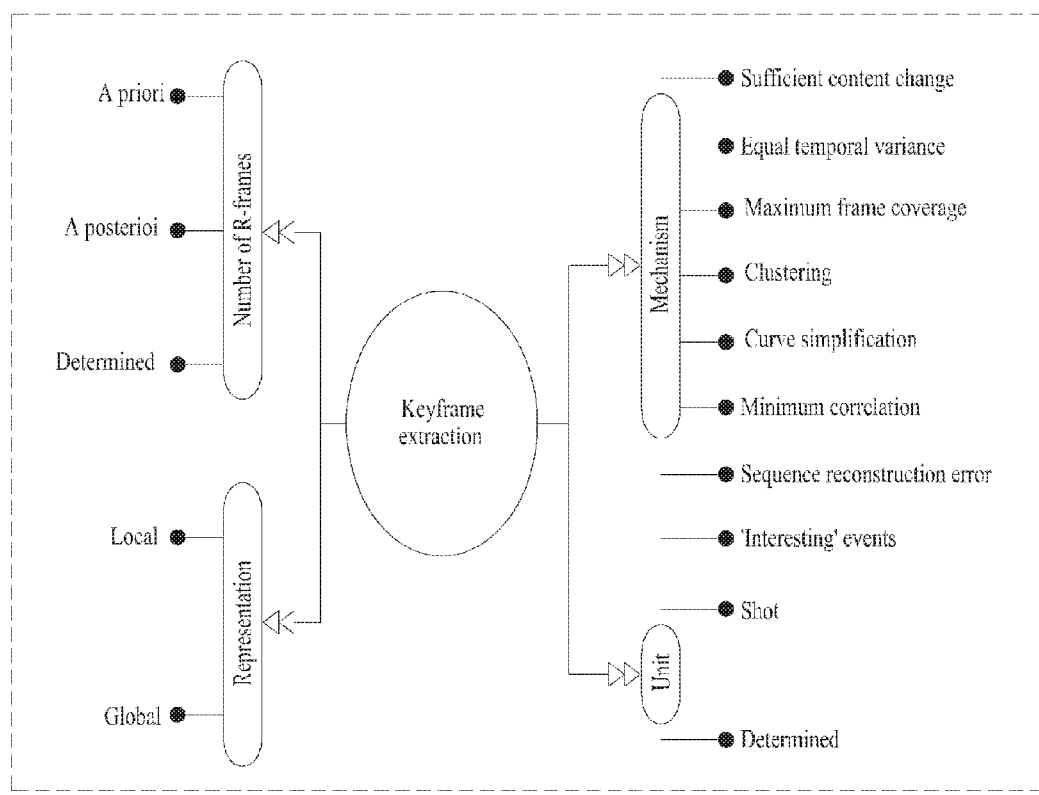
FIG. 7 exemplarily illustrates a scheme for extracting a still image in a content providing system according to an embodiment.

FIG. 7 exemplarily illustrates a scheme for extracting a still image in a content providing system according to an embodiment.

FIG. 7 is prepared for illustrating an image extraction method of the content providing system by referring B.-T. Truong and S. Venkatesh, "Video abstraction: a systematic review and classification", ACM Trans. On Multimedia Computing, Comm. And Applications, vol. 3, no. 1, February 2007.

The content providing system may extract a still image from video which is included in content. For example, the content providing system a still image through a known method such as Representation, Number of R-frame, Unit, or Mechanism based on the property of video.

The content providing system may extract a still image through audio mining from video with a section of a specific effect such as laugh. For a broadcasting content, the content providing system may extract a still image from video by using metadata information for broadcasting.

The content providing system may extract audio, which corresponds to a still image, to generate a script corresponding to the audio, and may add a caption to the still image based on the generated script. In the case without an additional caption, the content providing system may extract and insert a script through an audio mining technique. Additionally, the content providing system may provide a caption through an image (e.g., icon, sticker, etc.) which matches with information relevant to background sound (e.g., applause, music, etc.) of video. In the case with an additional caption, the content providing system may insert a script, which corresponds to its still image cut, in a form of caption based on a change point of the script on a caption file (e.g., sml. srt, sup, idx, ass, etc.).

FIG. 8 is a flow chart showing a content providing method of a content providing system according to an embodiment.

The content providing system may interpret a streaming control mechanism between an original content server and a motion-to-picture server. In the case that the original content server provides an adaptive streaming function (e.g., HTTP adaptive streaming, MPEG DASH, etc.), the motion-to-picture server may arise the problems involved in content continuity for decoding and involved in content preloading for processing time.

To solve those problems, the content providing system may buffer content in accordance with a request for the content (810, 820). The content providing system may extract at least one still image from video included in the content and may add segment identification data, which corresponds to the still image, in a form of metadata (830).

The content providing system may extract audio corresponding to the still image (840), and may generate a script corresponding to the extracted audio (850). The content providing system may add a caption to the still image based on the generated script and then may generate a caption-added still image (860).

The content providing system may determine whether content is loaded in a user terminal. The content providing system may determine whether a content including a caption-added still image is loaded in a user terminal by confirming segment identification (ID) data of a still image. During this, the content providing system may determine the state through an asynchronous monitoring function for confirming whether there is content loading and consumption on a service of the user terminal.

The content providing system may determine whether a difference between segment ID data of a buffer and segment ID data of a still image requested for consumption by a user is lower than a value. This value may be set optionally by an operating manager or may be even set by synthetically counting a standby time until the generation of a still image in consideration of a processing overhead. For example, in the case that a service is delayed due to a system load, more preloading may be required. The content providing system may request for loading content in the case that a difference between segment ID data of a buffer and segment ID data of a still image requested for consumption by a user is lower than the value. During this, the content providing system may request a streaming for the next content of segment ID data which is recently received at a server-side buffer.

FIG. 9 illustrates a flow of inserting an additional content in a content providing system according to an embodiment.

The content providing system may provide an additional content, which is offered on a content including video, even in a still-image based environment. The content providing system may provide a pre-replaying content (e.g., preloading advertisement), an inserted content, and a pop-up content, which are provided in a content including video, even when providing a still-image based content.

The content providing system may provide an image advertisement by predicting a processing time for converting a content, which includes video, into a still-image based content.

The content providing system may be compatible with an MPEG-DASH based advertisement inserting function. The content providing system may request an advertisement content from an advertisement server by a user terminal for the compatibility with a DASH-Player based advertisement selecting function of the user terminal.

A motion-to-picture server 920 may transmit a request additional content ID to an original content server 910 to request a streaming based on ID data of content. The original content server 910 may determine a domain-based or policy-based streaming target environment (942). The original content server 910 may request an additional content by transmitting a request additional content ID or streaming content ID to an advertisement server 930 (943). The advertisement server 930 may select an additional content and may generate a tracking ID (944).

The advertisement server 930 a response additional content ID to the original content server 910. The original content server 910 may transmit the response additional content ID to the motion-to-picture server 920. The motion-to-picture server 920 may determine the response additional content ID based on an additional content insertion mechanism (945). The motion-to-picture 920 may form content and may transmit a content, which includes an additional content, to the original content server 910 (946). The original content server may transmit additional content tracking information to the advertisement server 930.

FIG. 10 illustrates an image-based video consumption scheme in a content providing system according to an embodiment.

The content providing system may provide content to a user terminal 1000 in response to a request for consuming the content, and may provide a still image 1030 to which a caption is added as the user terminal 1000 for video streaming in real time. During this, a user may scroll the screen as shown by 1050 to see the caption-added still image.

The content providing system may provide a function of adding metadata to a still image. During this, the still image, which is generated in a form of still cut for content consumption information and individual sharing, may have information of the additional metadata. For example, a still image may include information about an inherent still-cut ID, an original content URI, a still-cut generation point, caption inclusion, caption content, and so on.

The content providing system may provide a function of sharing with an external service based on a still image (1010). During this, the content providing system may generate IDs respective to still images and may provide the IDs to be shared with an external service. When the sharing with an external service is available, the content providing system may provide a function of selecting whether to share a corresponding still image, whether to share the entire still image, whether to share video of its corresponding point, or whether to share the entire video.

The content providing system may provide a function of providing video which is included in the content (1040). The content providing system may provide a view function from a corresponding point of the original content view function.

The content providing system may provide a function of adding a still image. The content providing system may additionally extract and load a still image between corresponding time points as there is a pinch zoom-out 1020 between still images by a user.

A system described above may be implemented in hardware elements, software elements, and/or a combination of hardware and software elements. For example, a system, unit, or element described above may be implemented with one or more universal or special computers, such as processor, controller, Arithmetic Logic Unit (ALU), digital signal processor, microcomputer, Field Programmable Gate Array (FPGA), Programmable Logic Unit (PLU), microprocessor, or other units capable of executing and responding instructions. A processing unit may perform an Operating System (OS) and one or more software applications executed in the OS. Additionally, a processing unit may access, store, control, and generate data in response to software executions. Although some embodiment is illustrated as employing one processing unit for convenience of understanding, it can be seen by those skilled in the art that a plurality and/or diversity of processing elements may be included in use. For example, a processing unit may include a plurality of processors or one processor and one controller. Additionally, a processing unit may be formed in other processing configuration like a parallel processor.

Software may include computer programs, codes, instructions, or one or more combinations with them, may configure a processing unit, or may instruct a processing unit independently or collectively. For being interpreted by a processing unit or for providing instructions or data to a processing unit, software and/or data may be embodied permanently or temporarily in some kind of machine, component, physical apparatus, virtual equipment, computer storage medium or unit, or transmitted signal wave. Software may be distributed in computer systems connected through a network and may be stored and executed in distribution. Software and data may be stored in one or more computer-readable recording media.

Methods according to embodiments may be implemented in the form of program instructions executable through diverse computing means and may be recorded in computer readable media. The computer readable media may include independently or associatively program instructions, data files, data structures, and so on. Program instructions recorded in the media may be specially designed and configured for embodiments, or may be generally known by those skilled in the computer software art. Computer readable recording media may include magnetic media such as hard disks and floppy disks, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

According to an embodiment of the inventive concept, a content providing system may shorten a loading time until replaying video at a user terminal and may reduce an amount of data use. Additionally, a content providing system may provide a high-quality still image in comparison to video even in a low-bandwidth environment of a user terminal, and may allow a fast content to be consumed. Additionally, a content providing system may allow a user to easily share or store a desired specific part.

According to an embodiment of the inventive concept, a content providing system may activate content consumption through extension of unified consumption channel, and may increase a degree of satisfaction for a user by a customized service. Additionally, a content providing system may provide a low-cost based service (e.g., reducing a cost for traffic and processing in comparison to video).

While the inventive concept has been described with reference to exemplary embodiments, it will be apparent to those skilled in the art that various changes and modifications may be made without departing from the spirit and scope of the inventive concept. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. A method for providing content, the method comprising:
   extracting at least one still image from video included in the content;
   extracting audio, which corresponds to the at least one still image, and generating a script corresponding to the audio; adding a caption to the at least one still image based on the generated script;
   providing, in response to a request of consumption to of the content, the at least one caption-added still image for the video that is streaming in real time; and
   loading the at least one caption-added still image on a user terminal if a difference between segment identification data of a buffer and segment identification data of the at least one caption-added still image for the content requested for consumption is lower than a value; and
   wherein the at least one caption-added still image is displayed in an interface that is separate and distinct from a video viewing interface for the video.

2. The method of claim 1, wherein the extracting of at least one still image from video included in the content comprises:
   extracting the at least one still image based on identification data of the content by determining inclusion of video that is included in the content or by recognizing state information of a user.

3. The method of claim 2, wherein the extracting of at least one still image from video included in the content comprises:
   extracting the at least one still image, which is relevant to a section where an effect is inserted, based on audio mining from the video or extracting the at least one still image using metadata information of the video.

4. The method of claim 3, wherein the extracting of at least one still image from video included in the content comprises:
   adding segment identification data by extracting the at least one still image.

5. The method of claim 1, wherein the providing of the at least one caption-added still image comprises:
   updating the at least one caption-added still image in an asynchronous form at a user terminal and providing an interface for interlocking the content based on an advertisement policy.

6. The method of claim 1, wherein the providing of the at least one caption-added still image comprises:
   providing at least one of functions of adding metadata to the at least one caption-added still image, sharing the at least one caption-added still image with an external service, replaying video that is included in the content, and adding the at least one caption-added still image.

7. A non-transitory computer-readable medium with an instruction controlling a computer system to provide a content, wherein the instruction controls the computer system by a method comprising:
   extracting at least one still image from video included in the content;
   extracting audio, which corresponds to the at least one still image, and generating a script corresponding to the audio; adding a caption to the at least one still image based on the generated script;

providing, the content in response to a request of consumption to of the content, and providing the at least one caption-added still image for the video that is streaming in real time; and loading the at least one caption-added still image on a user terminal if a difference between segment identification data of a buffer and segment identification data of the at least one caption-added still image for the content requested for consumption is lower than a value; and wherein the at least one caption-added still image is displayed in an interface that is separate and distinct from a video viewing interface for the video.

8. A system for providing content, the system comprising:

an extraction part configured to extract at least one still image from video included in the content;

a generation part configured to extract audio, which corresponds to the at least one still image, and generating a script corresponding to the audio; an addition part configured to add a caption to the at least one still image based on the generated script; a provision part configured to provide the at least one caption-added still image in response to a request of consumption to of the content and providing the at least one caption-added still image for the video that is streaming in real time; and wherein the provision part loads the at least one caption-added still image on a user terminal if a difference between segment identification data of a buffer and segment identification data of the at least one caption-added still image for the content requested for consumption is lower than a value and the at least one caption-added still image is displayed in an interface that is separate and distinct from a video viewing interface for the video.

9. The system of claim 8, wherein the extraction part extracts the at least one still image based on identification data of the content by determining inclusion of video that is included in the content or by recognizing state information of a user.

10. The system of claim 9, wherein the extraction part extracts the at least one still image, which is relevant to a section where an effect is inserted, based on audio mining from the video or extracts the at least one still image using metadata information of the video.

11. The system of claim 10, wherein the extraction part adds segment identification data by extracting the at least one still image.

12. The system of claim 8, wherein the provision part updates the at least one caption-added still image in an asynchronous form at a user terminal and provides an interface for interlocking the content based on an advertisement policy.

13. The system of claim 8, wherein the provision part provides at least one of functions of adding metadata to the at least one caption-added still image, sharing the at least one caption-added still image with an external service, replaying video that is included in the content, and adding the at least one caption-added still image.

* * * * *